United States Patent
Lee et al.

(10) Patent No.: US 8,898,704 B2
(45) Date of Patent: Nov. 25, 2014

(54) DISPLAY DEVICE AND METHOD FOR PROVIDING DATA BROADCASTING THEREOF

(75) Inventors: Hyung-Il Lee, Gumi (KR); Jea-Hoon Choi, Gumi (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 13/132,395

(22) PCT Filed: Apr. 22, 2009

(86) PCT No.: PCT/KR2009/002107
§ 371 (c)(1),
(2), (4) Date: Aug. 16, 2011

(87) PCT Pub. No.: WO2010/064765
PCT Pub. Date: Jun. 10, 2010

(65) Prior Publication Data
US 2011/0292284 A1  Dec. 1, 2011

(30) Foreign Application Priority Data

Dec. 3, 2008 (KR) .......... 10-2008-0121582

(51) Int. Cl.
*G06F 3/00* (2006.01)
*H04N 5/445* (2011.01)
(Continued)

(52) U.S. Cl.
CPC .......... *H04N 5/4401* (2013.01); *H04N 21/488* (2013.01); *H04N 21/4263* (2013.01);
(Continued)

(58) Field of Classification Search
CPC .......... H04N 21/431; H04N 21/4312; H04N 21/4345; H04N 21/4516; H04N 21/4586; H04N 21/8126

USPC .......... 725/37–40, 43–47, 50–51, 54
See application file for complete search history.

(56) References Cited

U.S. PATENT DOCUMENTS

2005/0108701 A1* 5/2005 Kwon et al. .......... 717/168
2005/0155057 A1* 7/2005 Wei .................. 725/38
(Continued)

FOREIGN PATENT DOCUMENTS

CN   1647501 A   7/2005
CN   101141589 A  3/2008
(Continued)

OTHER PUBLICATIONS

TS 101812.V1.2.1; DVB Organization, Digital Video Broadcasting c/o EBU-17A Ancienne Route, CH-1218 Grant Saconnex, Geneva, Switzerland, Oct. 3, 2003 (XP 01783076).

(Continued)

*Primary Examiner* — Nasser Goodarzi
*Assistant Examiner* — Kyu Chae
(74) *Attorney, Agent, or Firm* — KED & Associates LLP

(57) ABSTRACT

A display device according to the proposed embodiment includes a broadcasting signal receiving unit that receives a broadcasting signal; a broadcasting signal) separation unit that separates the broadcasting signal received through the broadcasting signal receiving unit into video, audio, and data signals; a controller that analyzes the data signal separated through the broadcasting signal separation unit to comprehend whether data broadcasting is serviced and the kind of the data broadcasting; and a memory that stores information on a channel on which the data broadcasting is serviced according to a control signal of the controller and information on the kind of the serviced data broadcasting, wherein the broadcasting receiving unit sequentially receives and outputs broadcasting signals of an entire channel according to the control signal of the controller.

8 Claims, 6 Drawing Sheets

701

| CH INFORMATION | CAPTION BROADCASTING | SERVICE KIND INFORMATION | UPDATE INFORMATION |
|---|---|---|---|
| DTV 20 -1 | | N  W  P.G  G | NEW |
| DTV 22 -1 | | N  G | |
| DTV 23 -1 | | N  W  G | NEW |
| DTV 유선 11-1 | | N  W  P.G  G | NEW |
| DTV 유선 13-1 | | G | |
| DTV 유선 15-1 | | N  W | |

(51) Int. Cl.
*H04N 5/44* (2011.01)
*H04N 21/488* (2011.01)
*H04N 21/426* (2011.01)
*H04N 21/482* (2011.01)
*H04N 21/434* (2011.01)
*H04N 21/431* (2011.01)
*H04N 21/435* (2011.01)

(52) U.S. Cl.
CPC ....... *H04N 21/4821* (2013.01); *H04N 5/44508* (2013.01); *H04N 21/4345* (2013.01); *H04N 21/4312* (2013.01); *H04N 21/435* (2013.01)
USPC .................. 725/50; 725/37; 725/38; 725/39; 725/40; 725/43; 725/44; 725/45; 725/46; 725/47; 725/51; 725/54

(56) References Cited

U.S. PATENT DOCUMENTS

| | | | |
|---|---|---|---|
| 2006/0053469 A1 | 3/2006 | Newton et al. | 725/135 |
| 2006/0095952 A1* | 5/2006 | Chung | 725/136 |
| 2006/0143652 A1* | 6/2006 | Chung | 725/43 |
| 2006/0212902 A1 | 9/2006 | Seo et al. | 725/39 |
| 2006/0277575 A1* | 12/2006 | Lee et al. | 725/45 |
| 2007/0283402 A1* | 12/2007 | Yu | 725/114 |
| 2008/0066105 A1* | 3/2008 | Kim et al. | 725/40 |

FOREIGN PATENT DOCUMENTS

| | | |
|---|---|---|
| EP | 1 940 057 A2 | 2/2008 |
| JP | 2006-512818 T | 4/2006 |
| KR | 10-0406633 B1 | 11/2003 |
| KR | 10-2006-0127308 A | 12/2006 |
| KR | 10-0777409 B1 | 11/2007 |
| KR | 10-2008-0022640 A | 3/2008 |
| WO | WO 2005/104556 A1 | 11/2005 |
| WO | WO 2007/004744 A1 | 1/2007 |

OTHER PUBLICATIONS

European Search Report dated May 9, 2012 issued in Application No. 09 83 0503.
PCT International Search Report dated Jan. 5, 2010 issued in Application No. PCT/KR2009/002107.
Chinese Office Action dated Mar. 26, 2013 issued in Application No. 200980156071.8 (with English translation).
Korean Office Action issued in Application No. 10-2008-0121582 dated Oct. 8, 2014.

* cited by examiner

Fig. 1
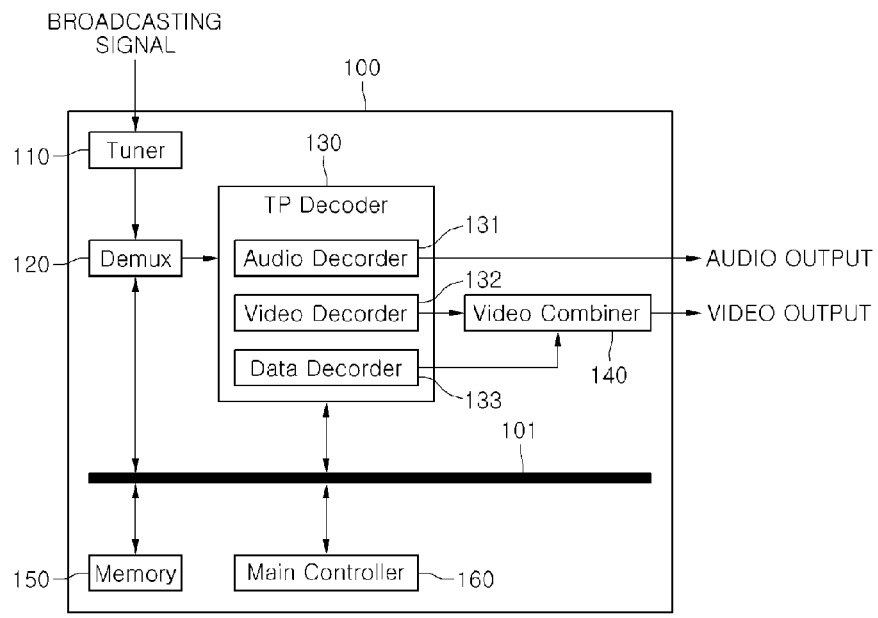
Fig. 2
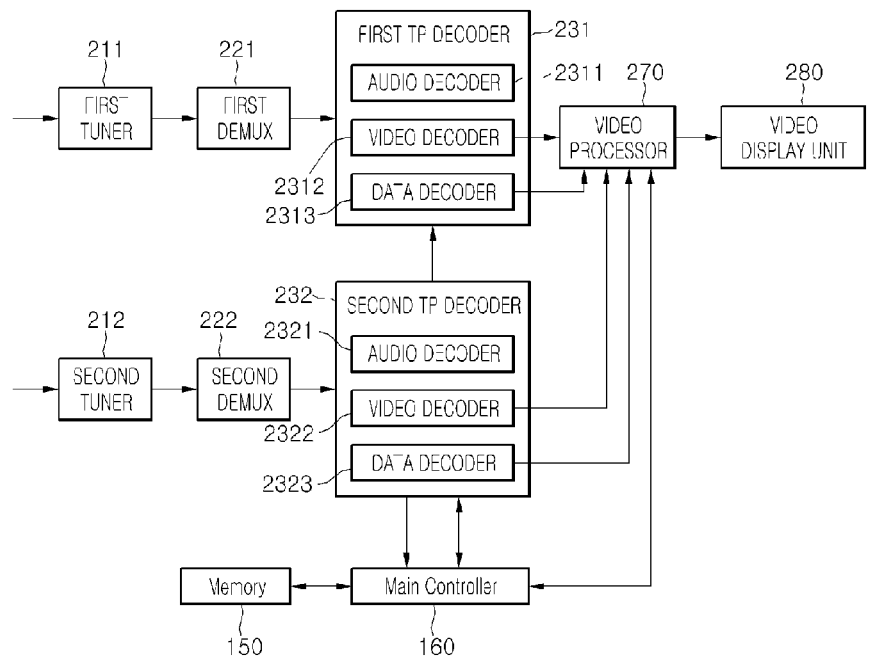
Fig. 3
| | No. of Bits | Identifier |
|---|---|---|
| application_signalling_descriptor() {<br>    descriptor_tag<br>    descriptor_length<br>    for( i=0; i<N; i++ ) {<br>        application_type<br>        reserved_future_use<br>        AIT_version_number<br>    }<br>} | <br>8<br>8<br><br>16<br>3<br>5 | <br>uimsbf<br>uimsbf<br><br>uimsbf<br>bslbf<br>uimsbf |
300

| CH INFORMATION | CAPTION BROADCASTING | SERVICE KIND INFORMATION | UPDATE INFORMATION |
|---|---|---|---|
| DTV 20 -1 | | N　W　P.G　G | NEW |
| DTV 22 -1 | | N　W　P.G　G | |
| DTV 23 -1 | | N　W　P.G　G | NEW |
| DTV 유선 11-1 | | N　W　P.G　G | NEW |
| DTV 유선 13-1 | | N　W　P.G　G | |
| DTV 유선 15-1 | | N　W　P.G　G | |

| CH INFORMATION | CAPTION BROADCASTING | SERVICE KIND INFORMATION | UPDATE INFORMATION |
|---|---|---|---|
| DTV 20 -1 | | N　W　P.G　G | NEW |
| DTV 22 -1 | | N　　　　　G | |
| DTV 23 -1 | | N　W　　　G | NEW |
| DTV 유선 11-1 | | N　W　P.G　G | NEW |
| DTV 유선 13-1 | | 　　　　　G | |
| DTV 유선 15-1 | | N　W | |

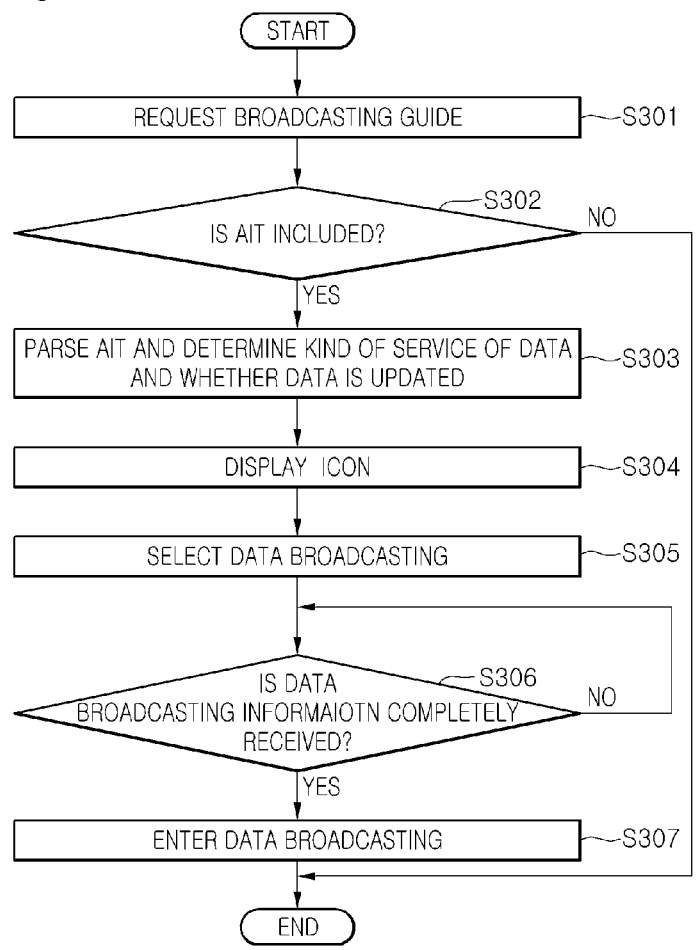

DISPLAY DEVICE AND METHOD FOR PROVIDING DATA BROADCASTING THEREOF

TECHNICAL FIELD

The present embodiment relates to a display device. In particular, the present embodiment searches information related to data broadcasting as a background and provide it to a user.

BACKGROUND ART

As a real digital broadcasting period has recently started, video signals and audio signals in a digital shape have been provided to allow viewers to enjoy clearer and more vivid image quality and multi-channel sound.

Also, data broadcasting constituted by graphics and characters-centered additional data has been recently provided to provide diverse information to viewers. Here, the data broadcasting is provided separately from the present broadcasting program that is currently viewed by a user.

By way of one example of the data broadcasting, program information to be processed, time information, and caption information for hearing-impaired person are provided for all channels. Also, a two-way communication is available to provide diverse additional functions that enable for the user to enjoy shopping while viewing the program.

In such data broadcasting, an update process of the data broadcasting according to an Advanced Common Application Platform (ACAP) standard is performed in real time through Application Information Table (AIT) and Digital Storage Media-Command and Control (DSM-CC) data transmitted from a broadcasting station.

The AIT and DSM-CC are data transmitted to a transport stream of DTV. The AIT has information on whether the data broadcasting exists and updates information. DSM-CC has data (for example, picture and font) control information of the substantial data broadcasting.

As the data broadcasting is provided as described above, a broadcasting view type is changed from a type that a user views a program transmitted one-sidedly from a broadcasting station to a selective broadcasting view type that a user selects and views the provided programs.

Also, the data broadcasting includes diverse sorts of additional information such as news, weather, home shopping, stock information, games and traffic situations, such that the user can select only his or her desired specific additional information of the diverse sorts of additional information and obtain the information thereof.

DISCLOSURE OF INVENTION

Technical Problem

In the proposed embodiment, a channel that provides data broadcasting as a background is confirmed and is provided to a user.

In the proposed embodiment, information on the data broadcasting for channels other than the channel that is currently viewed is easily comprehended without a separate channel change operation.

In the proposed embodiment, information on a channel on which the data broadcasting exists and the kind of service of the data broadcasting provided on the channel are confirmed and are provided to the user.

In the proposed embodiment, a field in which information on whether the data broadcasting is updated within AIT information is recorded is analyzed to provide information on a channel on which a new data broadcasting is provided to the user.

The technical problems that are to be solved in the proposed embodiment are not limited to the technical problems described above, and another technical problems not described above may be clearly understood by those skilled in the art to which the present invention pertains from the following description.

Technical Solution

According to the proposed embodiment, there is provided a display device, including: a broadcasting signal receiving unit that receives a broadcasting signal; a broadcasting signal separation unit that separates the broadcasting signal received through the broadcasting signal receiving unit into video, audio, and data signals; a controller that analyzes the data signal separated through the broadcasting signal separation unit to comprehend whether data broadcasting is serviced and the kind of the data broadcasting; and a memory that stores information on a channel on which the data broadcasting is serviced according to a control signal of the controller and information on the kind of the serviced data broadcasting, wherein the broadcasting receiving unit sequentially receives and outputs broadcasting signals of an entire channel according to the control signal of the controller.

According to the proposed embodiment, there is provided a method for providing data broadcasting of a display device, including: receiving a broadcasting signal; confirming whether AIT information is included within a data signal of the received broadcasting signal; reading-out information on the kind of service of the data broadcasting described within the AIT information; and providing additional information on a channel on which the data broadcasting is serviced using the read-out information.

According to the proposed embodiment, there is provided a display device, including: a broadcasting signal receiving unit that receives a broadcasting signal; a broadcasting signal separation unit that separates the broadcasting signal received through the broadcasting signal receiving unit into video, audio, and data signals; a controller that obtains update relevant information of data broadcasting described within the AIT depending on whether Application Information Table (AIT) is included within the data signal; and a memory that stores the update relevant information obtained by the controller, wherein the controller compares the update relevant information obtained at a previous time point to be stored in the memory with update relevant information obtained at the present time point, and confirms whether the data broadcasting included in the received broadcasting signal is updated.

According to the proposed embodiment, there is provided a method for providing data broadcasting of a display device, including: receiving a broadcasting signal; determining whether AIT information is included within a data signal of the received broadcasting signal; reading-out update relevant information of the data broadcasting described within the AIT information; and comparing the read-out update relevant information with update relevant information read-out at a previous time point and confirming whether the data broadcasting is updated.

According to the proposed embodiment, there is provided a data broadcasting information providing interface in which additional information included in a broadcasting signal is provided to an OSD screen of a display device, including: a channel information display region on which information on channels on which data broadcasting is serviced is displayed; and a service kind information display region on which indicators corresponding to the kind of data broadcasting serviced on the respective channels are displayed.

Advantageous Effects

With the device and the method thereof in the proposed embodiment as described above, when the user confirms the channel information of the data broadcasting, the channel information that provides the data broadcasting and the kind of service of the data broadcasting provided from each channel can be promptly comprehended, without having a standby time rendered in confirming whether the data broadcasting for the entire channel is serviced.

With the proposed embodiment, the channel information that the new data broadcasting is provided can be easily comprehended so that the updated data broadcasting can be easily viewed.

BRIEF DESCRIPTION OF DRAWINGS

The above and other objects, features and advantages of the present invention will become apparent from the following description of preferred embodiments given in conjunction with the accompanying drawings, in which:

FIG. 1 is a view showing a constitution of a display device according to the proposed embodiment;

FIG. 2 is a view showing a detailed constitution of the display device according to the proposed embodiment;

FIG. 3 is a view showing the partial technical content of AIT information applied to the embodiment of the present invention;

FIG. 13 is a flowchart showing a method for providing data broadcasting of a display device according to proposed another embodiment for each step.

BEST MODE FOR CARRYING OUT THE INVENTION

Figures 4, 5, 6, 7:
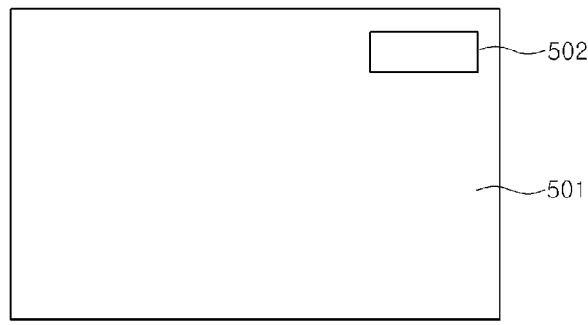
FIG. 4 is a view explaining content of a descriptor inserted into a field of the AIT information.
FIGS. 5 to 10 are views showing examples of screens that provide information relevant to data broadcasting to a user according to the proposed embodiment.

The proposed embodiment will be described.

Hereinafter, the proposed embodiment will be described in detail with reference to the accompanying drawings. The range of the technical idea of the present embodiment may be limited from the embodiments set forth herein. The technical idea of the present embodiment may include modifications such as adding, deletion, and change, etc. of the constituents of the proposed embodiment.

And, hereinafter, the term 'including' does not exclude the existence of constituents or steps other than those illustrated.

The proposed embodiment relates to a display device that can receive data broadcasting, and more particularly, to a device that can provide information on data broadcasting provided from channels other than a channel that a user currently views, and a method thereof.

FIG. 1 is a view showing a constitution of a display device according to the proposed embodiment.

Referring to FIG. 1, the display device 100 according to the embodiment includes a tuner 110 as a device that receives a broadcasting signal from the external (for example, a broadcasting station), a demodulator that demodulates a channel selected through the tuner 110, a demultiplexer DeMUX 120 that demultiplexes the demodulated signal into an audio signal, a video signal, a DVB-SI table or a PSIP table, and a decoder 130 that decodes the demultiplexed signal.

Here, as the device that receives the broadcasting signal, the tuner is exemplified, but in the case of a cable TV or a IPTV, the device that receives the broadcasting signal may be replaced by other constitution according to the product to which the device is applied.

And, the decoder 130 includes an audio decoder 131 that decodes and outputs the audio signal of the demultiplexed signal, a video decoder 132 that decodes and outputs the video signal of the demultiplexed signal, and a data decoder 133 that decodes the DVB-SI table or the PSIP table.

And, the display device 100 may further include a video combiner 140 that couples the video decoder 132 with the data output through the data decoder 133.

And, the display device 100 further includes a memory in which data decoded by the data decoder 133 are stored. Necessary data tables (SI information) for the demultiplexed data signal are parsed and the parsed SI information is stored in the memory 150.

Also, the display device 100 according to the embodiment further includes a controller 160 that parses Application Information Table (AIT) information from the data decoded from the data decoder 133, and includes a bus 101 that connects the controller 160, the memory 150, the demultiplexer 120, and the decoder 130.

The controller 160 reads-out information recorded on a pre-set specific field by parsing the AIT information.

In particular, the controller 160 controls a channel selection operation by the tuner 110 so that a video for a channel selected by a user can be displayed.

And, when the confirm of the data broadcasting is requested by the user, the controller 160 controls a sequential selection operation of the broadcasting signal corresponding to the entire channels using a tuner other than the currently used channel, that is, the tuner that receives the broadcasting signal for the channel that the viewer is currently viewing.

Also, the controller 160 determines whether the AIT information is included in the data signals of the sequentially received broadcasting signals corresponding to the entire channels.

In other words, for the broadcasting signals that are sequentially received, the controller 160 determines whether the AIT information is included in the corresponding data information for each broadcasting signal.

If the data broadcasting information including the AIT information is not included in the broadcasting signal for a specific channel, it is determined that the data broadcasting is not serviced on the channel.

If the data broadcasting information including the AIT information is received in the broadcasting signal for a specific channel, the controller 160 determines that the data broadcasting is currently serviced on the channel.

FIG. 2 is a view showing a detailed constitution of the display device according to the proposed embodiment.

FIG. 2 shows a case where a plurality of tuners are provided in the display device. In order to provide the data broadcasting information on other channel under a circumstance that the user cannot substantially recognize it, the tuner should be constituted in plural.

In other words, the detailed constitution of the display device according to the proposed embodiment includes a first tuner 211 and a second tuner 212 that receive broadcasting signal, demodulators that demodulate channels selected through the tuners 211 and 212, demultiplexers DeMUXs 221 and 222 that demultiplex the demodulated signal into an audio signal, a video signal, a DVB-SI table or a PSIP table, and first and second decoders 231 and 232 that decode the demultiplexed signal.

Therefore, the controller 160 controls the first tuner 211 to select the broadcasting signal of a specific channel selected by a user's instruction, and controls the second tuner 212 to sequentially select the broadcasting signals corresponding to the entire channel.

In other words, the first tuner 211 receives the broadcasting signal of the specific channel of a plurality of broadcasting signals received through an antenna, selected by the user's instruction. The broadcasting signal received through the selected channel has a Transport Stream (TS) stream shape. In particular, in the present invention, the broadcasting signal received by the first tuner is displayed through the entire screen of the display device or the main screen thereof.

Also, the second tuner 212 sequentially receives and outputs the broadcasting signals corresponding to the entire channel. At this time, the second tuner 212 is preferably operated to receive and output the broadcasting signals corresponding to the entire channel as a background.

Reviewing the constitution of the display device of FIG. 2 in more detail, the first demultiplexer 221 processes the broadcasting signal received through the first tuner 211, and the second demultiplexer 222 processes the broadcasting signal received through the second tuner 212.

And, the signals processed through the first demultiplexer 221 and the second demultiplexer 222 are transferred to the first and second decoders 231 and 232.

Here, the first demultiplexer 221 and the second demultiplexer 222 demultiplex the transport streams of the broadcasting signals received through the first tuner 211 and the second tuner 212, respectively, according to their properties to output them. At this time, the received transport stream is decoded to be divided into video/audio/data streams, respectively.

More specifically, the transport stream is constituted by a MPEG-2 transport stream (TS) in a packet of 188 byte unit, wherein the packet is configured of a header constituted by information on the packet and a payload constituted by actual data to be transmitted.

In the MPEG-2 TS, it is determined whether the corresponding payload is encoded video, audio, and data stream through Packet Identifier (PID) information of the packet header. The TS may be one TS that several programs constituted by audio, video and data, etc. are multiplexed. Therefore, in order to distinguish them, the respective programs and the Packet Identifier (PID) list of the entire program are prescribed in a special data format to be used.

Such information is referred to as Program Specific Information (PSI). The PSI is configured of tables such as a Program Association Table (PAT), a Program Map Table (PMT), and a Conditional Access Table (CAT), wherein the PMT has constitutional information of video, audio, and data that constitute one program, and PID information that can identify them.

And, the first decoder 231 performs a decoding operation of the video and audio signal for the channel that the user is currently viewing. In other words, the first decoder 231 includes an audio decoder 2311 that decodes an audio signal of the present channel, a video channel 2312 that decodes a video signal, and a data decoder 2313 that decodes a received data signal.

Also, if the user request a confirmation of the data broadcasting for other channel while viewing the broadcasting signal received through the first tuner 211, the controller 160 controls the second tuner 212 to allow the broadcasting signals for the entire channel to be received sequentially. And, the controller 160 determines whether AIT information is included in the data signal of the received broadcasting signal and reads-out information on the kind of service recorded in the AIT information.

In other words, the controller 160 determines whether the AIT information is included in the data signal of the broadcasting signal received through the second tuner 212. If the data broadcasting information including the AIT information is not included in the broadcasting signal for the received channel, it is determined that the data broadcasting is not serviced on the corresponding channel.

And, if the data broadcasting information including the AIT information is not included in the broadcasting signal for the received channel, the controller 160 determines that the data broadcasting is serviced on the corresponding channel.

At this time, when the data broadcasting information including the AIT information is received, the controller 160 parses the AIT information and analyzes 'application signaling descriptor' constituted in the AIT information.

Also, the controller 160 determines the kind of data broadcasting serviced on the received channel through the analysis of the 'application signaling descriptor'.

In other words, before the receipt of the data broadcasting signal for the received channel is completed, the controller 160 determines the kind of contents of the data broadcasting with reference to the 'application signaling descriptor', that is a specific field in the AIT information.

And, after the kind of service of the data broadcasting is confirmed, the controller 160 controls the second tuner 212 to perform a selection operation for the next channel. Thereby, the operation as described above is repeatedly performed for the next channel selected through the second tuner 212.

The constitution to describe the kind of broadcasting within the AIT information will be described in detail with reference to FIGS. 3 and 4.

FIG. 3 is a view showing the partial technical content of AIT information applied to the embodiment of the present invention, and FIG. 4 is a view explaining content of a descriptor inserted into a field of the AIT information.

According to the embodiment of the present invention, the AIT information is first encoded from the data broadcasting information received by the selected channel and the content recorded in the specific field pre-set in the AIT information is read-out, thereby allowing the kind of data broadcasting to be first provided to a user.

To this end, the second demultiplexer 222 allows the AIT information to be first output to the data decoder 2323 through a section filtering. The AIT includes information on application that is driven in a receiver for a data service.

The AIT may include information on the application, for example, information on an application name, an application version, an application priority, an application ID, an application state (auto-start, operable by a user), an application type, a position of a stream including application classes and a data file, an application base direction, and an application icon position, etc.

In particular, the proposed embodiment is characterized in that the field in which the information on the kind of service of the data broadcasting is recorded is constituted within the AIT information. For example, a 'data_service_kind' field is constituted in the 'application signaling descriptor' of the AIT.

The information on the kind of service of the data broadcasting received by the corresponding channel is recorded on the 'data_service_kind' field formed in the 'application signaling descriptor' and a search for the 'data_service_kind' is first performed among the AIT information in the received data signal.

A method to record the 'data_service_kind' field within the AIT information may use a reserved field of the fields recorded within the AIT information. In other words, the additional information for the corresponding data broadcasting, that is, the kind of data broadcasting, is recorded using the 'reserved_future_use' field of the 'application signaling descriptor' within the AIT information.

The 'reserved_future_use' field is allocated with a 3-bit data space, and the information on the kind of data broadcasting is recorded in consideration of the number of bits allocated to the 'reserved_future_use' field.

For example, the name of the reserved field is changed into a 'data_service_kind' and the information on the kind of service of the data broadcasting is recorded therein.

FIG. 4 exemplifies the information of kind of service of the data broadcasting recorded in the AIT information.

In other words, referring to FIG. 4, when the kind of data broadcasting serviced on the received channel is news, '0x000' may be recorded in the 'data_service_kind' field, the kind of data broadcasting serviced on the received channel is weather information, '0x001' may be recorded, when the kind of data broadcasting serviced on the received channel is 'stock information', '0x010' may be recorded, when the kind of data broadcasting serviced on the received channel is traffic information, '0x011' may be recorded, when the kind of data broadcasting serviced on the received channel is a broadcasting program guide, '0x100' may be recorded, and when the kind of data broadcasting serviced on the received channel is a game, '0x101' may be recorded.

The kind of service may also be sorted in more detail according to the amount of allocated data of the field in which the information on the kind of service of the data broadcasting is recorded. The present embodiment exemplifies the case where the kind of service is recorded in the 3-bit field.

And, the display device confirms the data recorded in the 'data_service_kind' field of the received data signal and then, displays it on a screen using predetermined icons, logs, or marks, etc. At this time, the information on the kind of data service may be provided through a data broadcasting information screen on which the information on the entire channel is combined or may be provided as a channel banner information for the present channel. This will be described in detail later.

In other words, it may be provided on the data broadcasting information screen or the channel banner, 'N' when the kind of service is news, 'W' when the kind of service is weather information, and 'S' when the kind of service is stock information.

When icons, etc. for the kind of each service are used in order to provide the information on the kind of the service of the data broadcasting, it may lead to more familiarity to the user. The characters 'N', 'W', 'S', 'T', 'P.G', and 'G' may be diagrammed or images that allow the user to more easily recognize the kind of each service may be used.

Also, reserved0 and sreserved1 fields are vacant even after the kind of service is recorded within the 3-bit field, such that the update relevant information of the data broadcasting provided from the corresponding channel is recorded within the vacant reserved0 and reserved 1 fields to be transmitted.

For example, the 'data_service_kind' may be still used as the name of the reserved fields, reserved0 and reserved 1 fields, or may be changed into 'data_service_update', wherein the update relevant information of the data broadcasting is recorded therein.

Here, a method to record the update relevant information of the data broadcasting records '0x110' when the corresponding data broadcasting is updated, and records '0x111' when the corresponding data broadcasting is not updated.

Also, compared to the method as described above, it is more preferable to change and transmit the information recorded in the field at a time point when the newly updated data broadcasting information is transmitted.

For example, when the data broadcasting is serviced on the corresponding channel, the originally transmitted update relevant information will be '0x110' or '0x111'. In other words, the update relevant information of the data broadcasting for the corresponding channel is recorded based on any one of the two recording information.

And, the update relevant information recorded thereafter is determined depending on whether the corresponding data broadcasting is updated. In other words, when the data broadcasting provided from the channel is updated, information different from the information recorded at a previous time point is recorded. To the contrary, when the data broadcasting is not updated, the same information as the information recorded at a previous time point is recorded.

For example, when the update relevant information at the previous time point is assumed to be recorded as '0x110' and the data broadcasting provided from the channel is not updated, '0x110' the same information as the information as above, is recorded in the field, and when the data broadcasting provided from the channel is updated, '0x111' information different from the information as above is recorded in the field.

Therefore, the controller 160 confirms the update relevant information recorded in the specific field within the received broadcasting signal and then, stores the confirmed update relevant information in the memory 150 to be corresponded to the corresponding channel information.

And, the controller compares the update relevant information confirmed and stored at the previous time point with the update relevant information confirmed at the present time point, and confirms whether the data broadcasting serviced on the channel is updated according to the comparison result.

In other words, when the update relevant information stored at the previous time point and the update relevant information confirmed at the present time point are the same, it is determined that the data broadcasting serviced on the channel is not updated, and when the two information are different from each other, it is determined that the data broadcasting serviced on the channel is updated.

Also, likewise the information on the kind of service of the data broadcasting, in order to provide update information of the data broadcasting, icons informing whether the information is updated are used. In other words, when the data broadcasting is updated, 'NEW' characters informing a new data broadcasting are diagrammed to allow a user to easily recognize the information on whether the data broadcasting is updated.

FIGS. 5 to 9 are views showing examples of screens that provide information relevant to data broadcasting to a user according to the proposed embodiment;

Here, the data broadcasting relevant information may provide a data broadcasting information screen for the entire channel on which the data broadcasting is provided, and may also provide the data broadcasting relevant information corresponding to the present channel as channel banner information.

FIG. 5 shows a first screen 501 from which a video signal for the channel that is currently viewing on a screen of the display unit and a second screen 502 that is output as OSD on the first screen 501 when a user requests a data broadcasting guide. Here, the second screen 502 is the data broadcasting information screen or the channel banner information screen. First, a case where the second screen 502 is the data broadcasting information screen will be described by way of example.

If the user inputs an instruction such as the broadcasting guide or the data broadcasting confirmation, etc. while he or she is viewing a specific channel of broadcasting contents by manipulating a remote control unit that can remotely control the operation of the display device, the controller 160 of the display device controls the demultiplexer 222 and the data decoder 2323 to confirm whether AIT is included in the received broadcasting signal, and the kind of service and whether the field is updated recorded in the AIT.

The second screen 502 includes information on the channel on which the data broadcasting is provided among the entire channel, and information on the kind of service of the data broadcasting provided from the channel and whether the data broadcasting is updated. The second screen 502 is positioned on the first screen 501 on which the video is displayed, and the display position may be changed variously.

FIG. 6 shows an example where the information on the kind of service of the data broadcasting and whether the data broadcasting is updated are displayed on the second screen 502. The second screen 502 may include a channel information display region 601 on which channel information that provides the data broadcasting, service kind information display region 602 on which information on the kind of service of the data broadcasting provided from each channel according to channel information displayed on the channel information display region 601 is displayed, and a update information display region 603 on which information on whether the data broadcasting provided from each channel according to the channel information displayed on the channel information display region 601 is updated is displayed.

On the channel information display region 601, only information on the channel on which the data broadcasting is serviced among the entire channel is displayed.

On the service kind information display region 602, service kind information corresponding to the channel information on which the data broadcasting is serviced is displayed, wherein service icons corresponding to the kind of services of the data broadcasting are displayed.

At this time, on the service kind information display region 602, all the service icons corresponding to the kind of entire services are displayed, and only the service icon provided from the corresponding channel among the service icons corresponding to the kind of entire services is highlighted. For example, in FIG. 6, 'N' and 'G' characters are highlighted for the 'DTV22-1' channel.

Also, referring to FIG. 7, on a service kind information display region 701, only icons showing the kind of service of the data broadcasting provided from the corresponding channel are displayed in a different manner, wherein the icons may be replaced by characters that additionally explain them to be displayed on the positions where the icons are displayed In other words, for the channel where only new service is provided, only 'N' characters may be displayed on the service kind information display region 701, and the characters 'N' may be replaced by characters 'NEWS' that additionally explain it to be displayed on the position where the characters 'N' are displayed. Also, the icon 'N' and the explanation characters 'NEWS' may be repeatedly replaced to be displayed.

On the update information display region 603, information on whether the data broadcasting provided from the corresponding channel is updated is displayed.

In other words, when the data described in the analyzed field is different from the previously stored data, the icon 'NEW' informing that the data broadcasting for the corresponding channel is updated is displayed on the update information display region 603 of the corresponding channel.

And, an interface constitution that provides the user with the information on the kind of service of the data broadcasting and the information on whether the data broadcasting is updated may be more variously formed.

Also, if information on any one specific channel of the channel information display region 601, the service kind information display region 602, and the update information display region 603 is selected on the second screen 502, the selection operation of the selected channel is made, such that the controller 160 controls the data broadcasting serviced on the channel to be displayed.

Therefore, the user is not required to perform a channel change operation in order to confirm the channel on which the data broadcasting is serviced, and in particular, he or she can confirm the kind of service of the corresponding data broadcasting before he or she completely receives a data signal.

Also, a case where the second screen 502 is the channel banner information screen will be described by way of example.

If the user inputs an instruction such as the broadcasting guide or the data broadcasting confirmation, etc. while he or she is viewing a specific channel of broadcasting contents by manipulating a remote control unit that can remotely control the operation of a video display device, the controller 160 of the display device controls the demultiplexer 120 and the data decoder 133 to confirm whether AIT is included in the received broadcasting signal, and the kind of service and field recorded in the AIT.

The second screen 502 includes information on whether the data broadcasting is provided on the present channel or the kind of service of the data broadcasting. The second screen 502 is positioned on the first screen 501 on which the video is displayed, and the display position may be changed variously.

Figure 8:
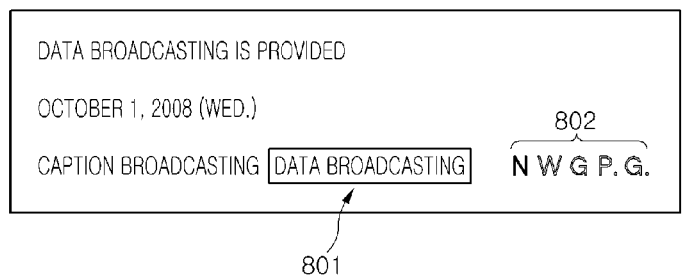
Figure 9:
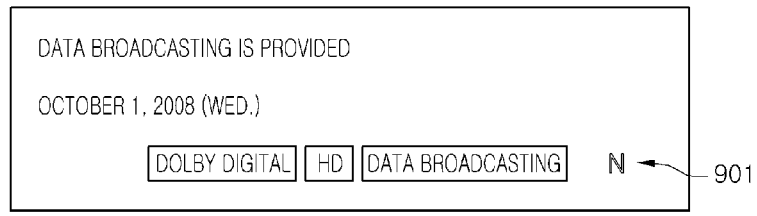

FIG. 8 shows an example where the information on the kind of service of the data broadcasting is displayed on the second screen 502. The second screen 502 may include a first region 801 on which the existence of the data broadcasting is displayed and a second region 802 on which the kind of service of the data broadcasting is displayed.

When the data broadcasting service is serviced on the present channel, that is, when the AIT exists in the data signal of the received broadcasting signal, the first region 801 may be highlighted or may be illuminated.

And, on the second region 802 on which the information on the kind of service of the data broadcasting is displayed, the service icon corresponding to the kind of read-out service may be highlighted. For example, in the drawing, the 'N' characters are highlighted so that the user may know that the data broadcasting for new information is receiving.

Figure 10:
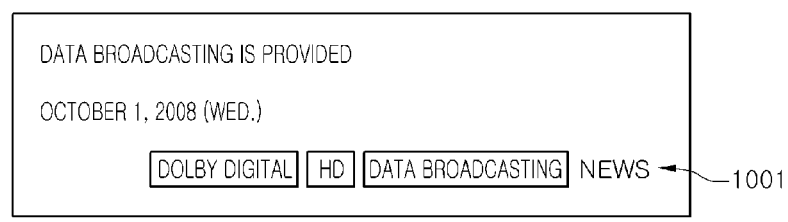

Also, information on the kind of service may be expressed in a different manner: an icon 901 that indicates the kind of service of the data broadcasting on the present channel may be displayed (see FIG. 9), and the icon may be replaced by characters 'NEWS' 1001 that additionally explain it to be displayed on the position where the icon 901 is displayed (see FIG. 10). In other words, the icon 901 and the explanation characters 1001 may be repeatedly replaced to be displayed.

And, an interface constitution that provides the user with the information on the kind of service of the data broadcasting may be more variously formed.

Also, by applying the method as described above, the controller 160 may extract only the channel on which the updated data broadcasting among the channels on which the data broadcasting is serviced is received by obtaining the update relevant information, that is, only the channel on which the new data broadcasting is served, and then may control the display device to display only the information on the channel on which the extracted new data broadcasting is serviced.

Figure 11:
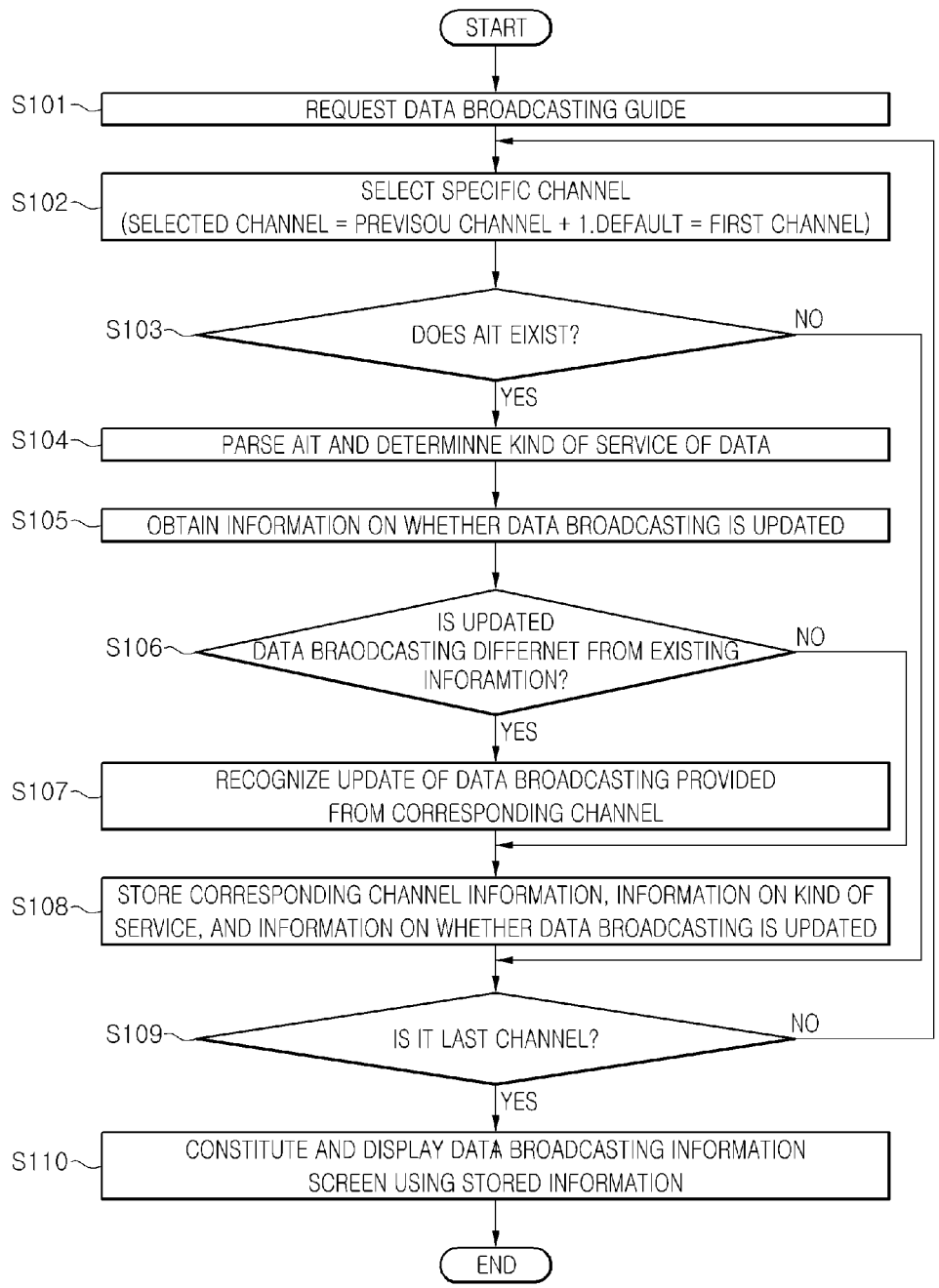
FIG. 11 is a flowchart showing a method for providing data broadcasting of a display device according to proposed one embodiment for each step.

FIG. 11 is a flowchart showing a method for providing data broadcasting of a display device according to proposed one embodiment for each step.

First, when the user requests a data broadcasting guide (S101), a channel number to be selected is explained and a broadcasting signal corresponding to the set channel number is received (S102). Here, the set channel number is set as a first channel using default, and if there is a channel previously selected, a channel number next to the previously selected channel number is set as the channel number to be selected. Also, the case where the user requests the data broadcasting guide may be a case where the user inputs an instruction in order to confirm EPG information or a case where the user inputs a data broadcasting confirmation key separately provided, etc.

And, it is determined whether AIT information is included in the data signal of the broadcasting signal received from the selected channel (S103).

In other words, when the AIT information is not included in the data signal of the received broadcasting signal, it may mean a case where the data broadcasting is not serviced onto the corresponding channel.

To the contrary, when the AIT information is included in the data signal of the received broadcasting signal, it may mean a case where the data broadcasting is serviced onto the corresponding channel.

And, as a result of the determination (S103), if the AIT information is included in the data signal of the received broadcasting signal, the AIT information is parsed to obtain information on the kind of service of the corresponding data broadcasting (S104). In other words, the kind of service of the data broadcasting is determined with reference to the specific field within the AIT information of the data broadcasting signal for the received channel, 'application signaling descriptor'.

Also, the update relevant information of the data broadcasting is obtained with reference to the specific field within the parsed AIT information, 'application signaling descriptor' (S105).

Continuously, it is determined whether the obtained update relevant information of the data broadcasting is the same as the update relevant information obtained within the data broadcasting signal of the conventional corresponding channel (S106).

And, as a result of the determination (S106), if the two information are the same, it is recognized that the data broadcasting provided from the corresponding channel is the same as the previously provided data broadcasting, that is, the data broadcasting which is not updated. To the contrary, when the two information are different, it is recognized that the data broadcasting provided from the corresponding channel is different from the previously provided data broadcasting, that is, the data broadcasting which is updated (S107).

Continuously, channel information that provides the data broadcasting, service kind information of the data broadcasting provided form the channel, and update information of the data broadcasting are stored (S108).

And, it is determined whether the selected channel is a last channel (S109). In other words, it is determined whether the processes S102-S10 are completely performed from the first channel to the last channel.

Continuously, as a result of the determination (S109), if the selected channel is the last channel, the data broadcasting information screen is constituted using the stored information and then is displayed (S110), and if not, it is returned to the step S102.

Also, by applying the method as described above, only the channel receiving the updated data broadcasting among the channels on which the data broadcasting is serviced by obtaining the update relevant information, that is, only the channel on which a new data broadcasting is serviced, may be extracted and then, only the information on the channel on which the extracted new data broadcasting is serviced may be displayed.

Figure 12:
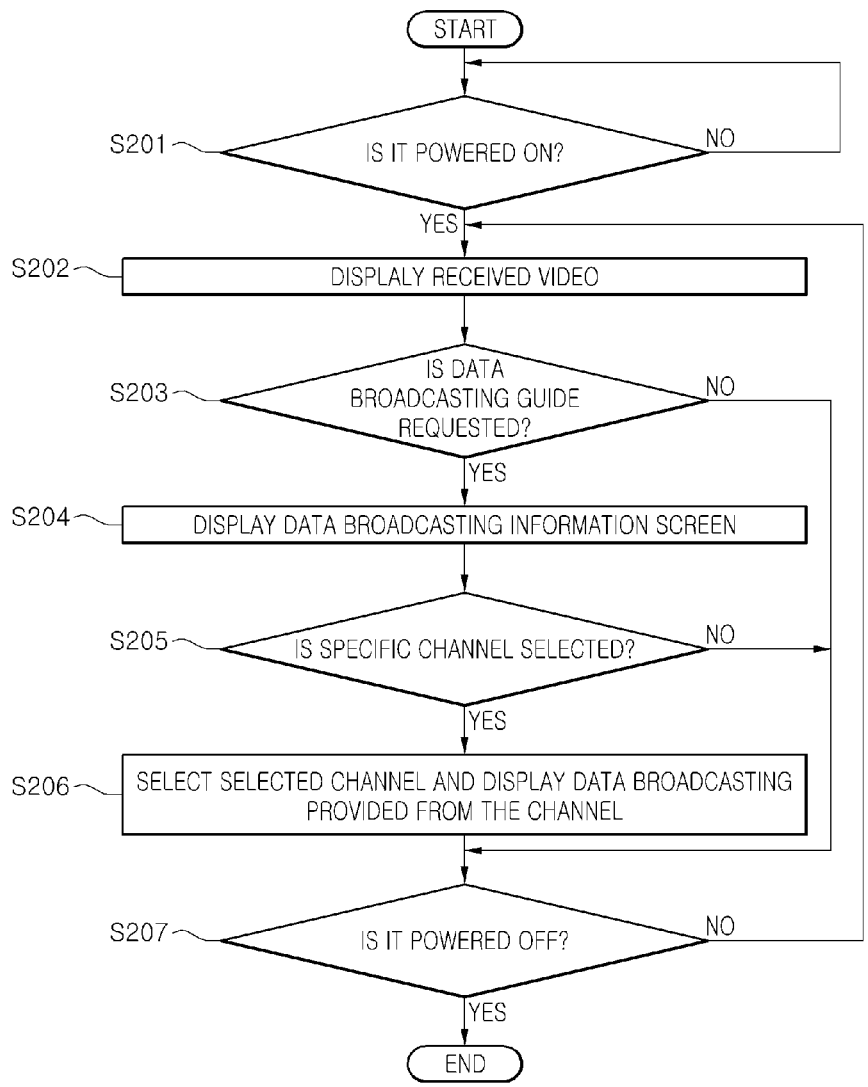
FIG. 12 is a flowchart showing a method for displaying data broadcasting of the display device according to the proposed embodiment for each step.

FIG. 12 is a flowchart showing a method for displaying data broadcasting of the display device according to the proposed embodiment for each step.

Referring to FIG. 12, first, when a power-on instruction is input by a user (S201), a video to be received is displayed (S202).

And, when the user requests a data broadcasting guide (S203), a data broadcasting information screen is constituted using pre-stored information and then, is displayed (S204).

Continuously, it is determined whether a specific channel of information is selected on the displayed data broadcasting information screen (S205).

And, as a result of the determination (S205), if the specific channel of information is selected on the displayed data broadcasting information screen, the selected channel is selected and the data broadcasting received on the selected channel is displayed (S206).

Continuously, if a power-off instruction is input, the display device is turned off, otherwise it is returned to the step 5202 to continuously display the currently received video (S207).

FIG. 13 is a flowchart showing a method for providing data broadcasting of a display device according to proposed another embodiment for each step.

First, when a user requests a data broadcasting guide (S301), it is first searched whether AIT information is included in a received broadcasting signal (S302). The case where the user requests the data broadcasting guide may be a case where the user inputs an instruction in order to confirm EPG information or a case where the user inputs a data broadcasting confirmation key separately provided, etc. Also, the broadcasting signal is a broadcasting signal corresponding to the channel that the user currently intends to view.

When the AIT information is not included in the data signal of the received broadcasting signal, it may mean a case where the data broadcasting is not serviced onto the present channel.

To the contrary, when the AIT information is included in the data signal of the received broadcasting signal, it may mean a case where the data broadcasting is serviced onto the present channel, and at this time, characters or icons, etc.

informing that the data broadcasting exists may be displayed on the screen of the video display device.

And, even before the receipt of the data broadcasting is completed, a demultiplexing and a decoding are performed on the received AIT information and the AIT information is parsed thereby, such that the kind of service and update relevant information described in the AIT information are determined (S203).

And, icons corresponding to each kind of the read-out services and update relevant icons are displayed on the screen (S204). The information on the kind of service of the data broadcasting displayed on the screen guides the user the use of the corresponding data broadcasting.

In other words, when the user selects the icon informing the kind of service displayed on the screen by manipulating a remote control unit, etc. (S205), an operation to receive the entirety of the corresponding data broadcasting information is performed (S206), and the user can use the corresponding data broadcasting when the receipt is completed (S207).

Industrial Applicability

The present invention can be performed in a display device that provides data broadcasting, thereby having industrial applicability.

The invention claimed is:

1. A display device, comprising:
   a broadcasting signal receiving unit configured to receive a broadcasting signal of a channel;
   a broadcasting signal separation unit configured to separate the broadcasting signal into video, audio, and data signals;
   a controller configured to determine whether data broadcasting is serviced from the channel, to compare data broadcasting received at a previous time point with data broadcasting received at a present time point from the channel when the data broadcasting is serviced from the channel, and to determine whether the data broadcasting received from the channel is updated according to a result of the comparison;
   a memory configured to store a first information on a channel on which the data broadcasting is serviced and a second information on a channel on which the data broadcasting is updated; and
   a display unit configured to display a data broadcasting information screen generated using the first information and the second information stored in the memory,
   wherein the controller is configured to determine that the data broadcasting received from the channel is not updated when the two data broadcastings are the same, and to determine that the data broadcasting received from the channel is updated when the two data broadcastings are different,
   wherein the broadcasting signal receiving unit sequentially receives and outputs broadcasting signals of an entire channel to a control signal of the controller,
   wherein the data broadcasting information screen includes a channel on which the data broadcasting is serviced and an indicator corresponding to whether the data broadcasting is updated,
   wherein the data signals include an Application Information Table (AIT), and
   the AIT includes a data service kind field that represents what kinds of broadcast programs are provided,
   the data broadcasting information screen further includes a plurality of service icons corresponding to the kinds of the broadcast programs, and
   the plurality of service icons represent what kinds of broadcast programs are provided from each channel.

2. The display device according to claim 1, wherein the controller is configured to comprehend whether the data broadcasting is serviced depending on whether the Application Information Table (AIT) is included within the data signal and to determine whether the data broadcasting is updated, using update relevant information described within an application signaling descriptor of the AIT.

3. The display device according to claim 2, wherein when the data broadcasting is serviced on the channel received through the broadcasting signal receiving unit, the controller controls the indicator corresponding to the kind of service of the data broadcasting serviced on the channel to be displayed as banner information of the corresponding channel.

4. The display device according to claim 1, wherein the broadcasting signal receiving unit includes a first broadcasting signal receiving unit that receives a broadcasting signal of a channel selected according to a user's instruction, and a second broadcasting signal receiving unit that sequentially receives broadcasting signals corresponding to the entire channel as a background.

5. A method for providing data broadcasting of a display device, comprising:
   receiving a broadcasting signal;
   confirming whether Application Information Table (AIT) information is included within a data signal of the received broadcasting signal;
   reading-out update relevant information of the data broadcasting described within the AIT information when the AIT is included within the data signal;
   comparing update relevant information read-out at a previous time point with the update relevant information readout at a present time point;
   determining that the data broadcasting is not updated when the two update relevant information are the same;
   determining that the data broadcasting is updated when the two update relevant information are different;
   generating a data broadcasting information screen that includes information on a channel on which the data broadcasting is serviced among an entire channel and an indicator corresponding to whether the data broadcasting is updated; and
   displaying the generated data broadcasting information screen,
   the AIT includes a data service kind field that represents what kinds of broadcast programs are provided,
   the data broadcasting information screen farther includes a plurality of service icons corresponding to the kinds of the broadcast programs, and
   the plurality of service icons represent what kinds of broadcast programs are provided from each channel.

6. The method for providing the data broadcasting of the display device according to claim 5, wherein the receiving the broadcasting signal comprises sequentially receiving broadcasting signals corresponding to an entire channel as a background.

7. The method for providing the data broadcasting of the display device according to claim 6, further comprising:
   when a specific channel is selected on the displayed data broadcasting information screen according to the user's instruction, displaying the data broadcasting serviced on the selected channel.

8. The method for providing the data broadcasting of the display device according to claim 5, further comprising:
   wherein when the data broadcasting is serviced on a channel selected according to a user's instruction, displaying an indicator corresponding to whether the data broadcasting is updated as banner information of the corresponding channel.

\* \* \* \* \*